UNITED STATES PATENT OFFICE.

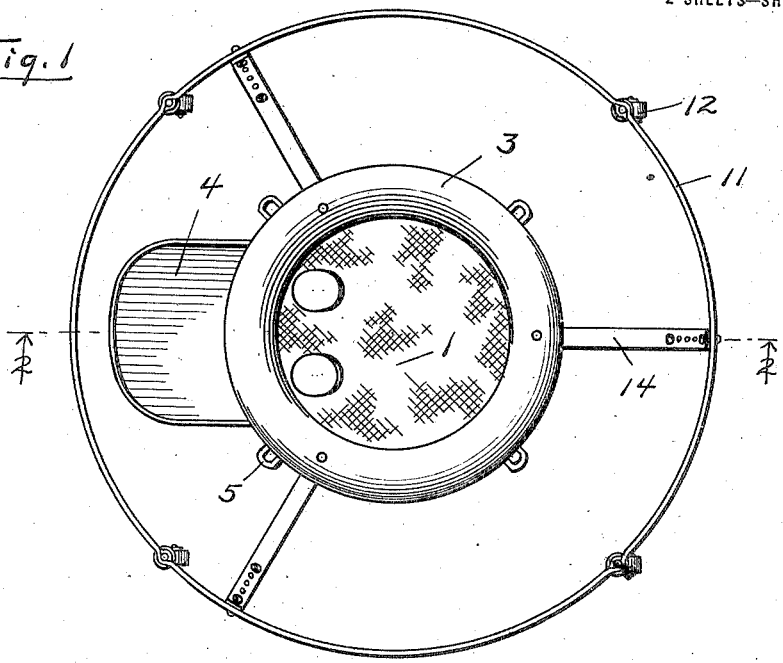
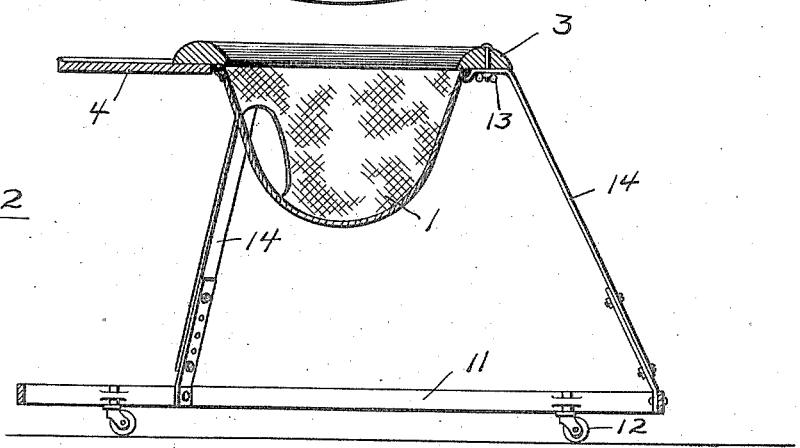
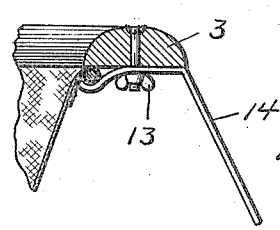
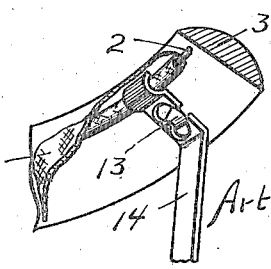

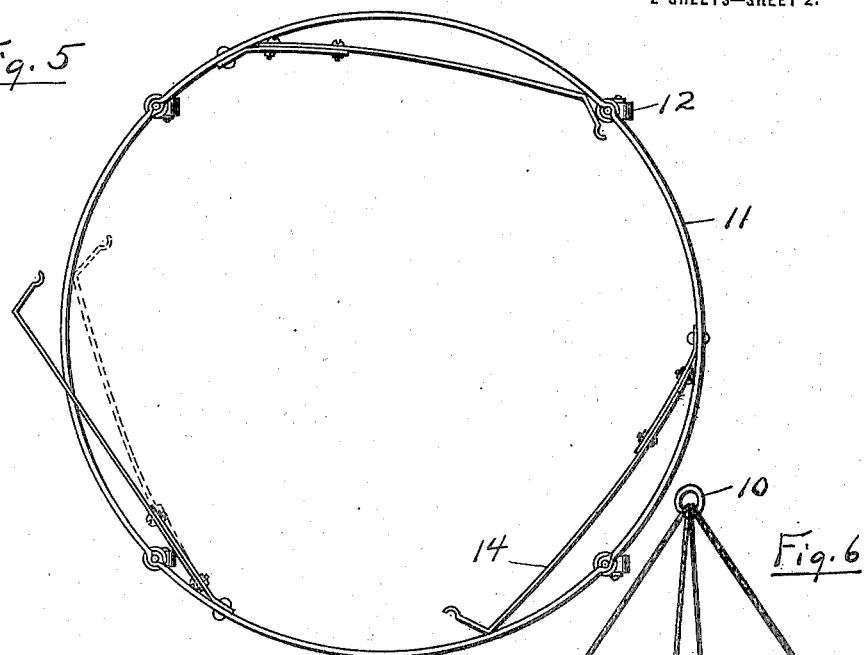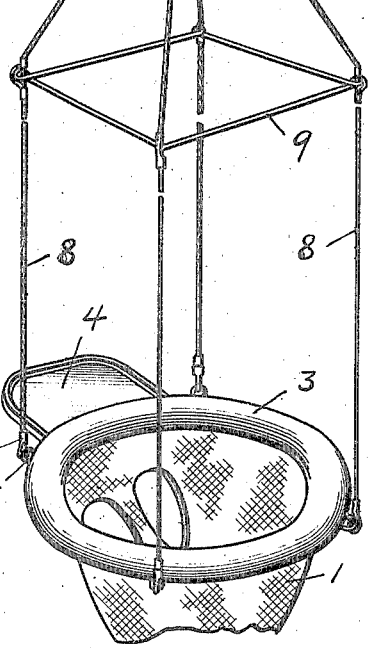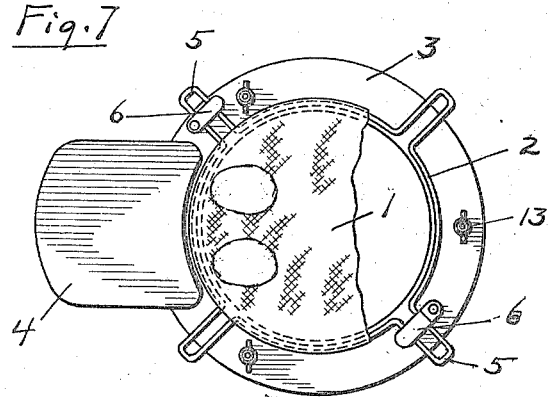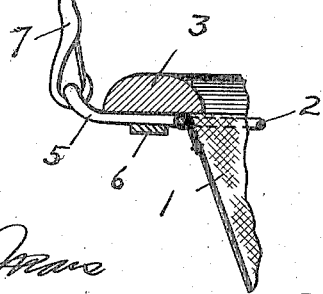

ARTHUR WESLEY, OF CHICAGO, ILLINOIS.

BABY WALKER AND SWING.

1,302,743.  Specification of Letters Patent.  Patented May 6, 1919.

Application filed April 22, 1918. Serial No. 230,003.

*To all whom it may concern:*

Be it known that I, ARTHUR WESLEY, a citizen of the United States, residing at Chicago, in the county of Cook and State of Illinois, have invented certain new and useful Improvements in Baby Walkers and Swings; and I do hereby declare the following to be a full, clear, and exact description of the invention, such as will enable others skilled in the art to which it appertains to make and use the same.

My invention relates to appliances for exercising and amusing young children, such as baby walkers and baby swings. In one of its general aspects, it aims to provide a suitable seat for the child in combination with means whereby this same seat may interchangeably serve either as a portion of a baby walker, or as a portion of a swing; and desirably also to provide a suitable guard for protecting portions of the connections between the seat and the other elements, and for affording a convenient hand-hold and arm rest for the child. Viewed in this same general aspect, my invention aims to provide a seat-carrier which will support the child independently of the guard formation, and which in turn may be supported either by suspension cords arranged to afford a swing, or by a frame equipped with casters.

In another aspect of my invention, I aim to provide a baby walker which may readily be collapsed into a small space, and which may speedily be erected and assembled without the use of tools into a rigid structure; to provide a base and leg formation which will permit the legs to be disposed substantially within the base when the device is not in use, and which will automatically hold the legs in their last named disposition; to provide simple and effective means for securing the seat-carrier together with the seat fastened thereto to a portion of the device (such as an arm rest), so that these portions need not be handled separately, and so that they still can be readily separated when the seat is to be washed; to provide simple means for detachably securing the legs firmly to the seat-carrier without the use of tools, and preferably to arrange these fastening means so that the seat-carrier and the legs may be simultaneously secured to a suitable guard formation. More particularly, my invention aims to provide a base structure for a baby walker comprising a hoop and resilient legs secured to the ring and adapted to be held entirely within the hoop by their own resiliency; also, to provide a seat-carrier made of wire and having certain portions adapted to be clamped between portions of a baby-walker structure, and having other portions adapted to be secured to suspension cords. Still other, and to some extent more detailed objects, will appear from the following specification and from the accompanying drawings, in which—

Figure 1 is a plan view of a baby walker embodying my invention.

Fig. 2 is a vertical and central section through the same.

Fig. 3 is an enlarged fragmentary view showing the method of securing the legs and the seat-carrier to the guard.

Fig. 4 is an under-side perspective view of the same parts.

Fig. 5 is a plan view of the frame, or base and leg portion, of the baby walker, with two of the legs swung into their compacted position, and the third leg only swung part way.

Fig. 6 is a fragmentary perspective view of my appliance when used as a baby swing.

Fig. 7 is a bottom plan view of the guard and seat portion of my appliance, with a portion of the seat cut away.

Fig. 8 is an enlarged and fragmentary vertical section showing the method of securing one of the suspension cords to the seat-supporting carrier of my appliance, when the latter is to be used as a swing.

In carrying out the objects of my invention, I provide a seat 1, desirably of textile material and approximately hemispherical in shape and equipped with a pair of openings through which the legs of the child may extend. This seat is secured at its edges to a suitable seat-carrier, such as a wire ring 2, which ring is both protected and concealed by a guard or frame which may desirably be in the form of a wooden ring 3, and which desirably has a tray 4 fastened to it. The seat-carrier 2 is desirably attached to the guard 3 by means permitting an easy detaching of the same, as for example by providing the wire 2 with integral loops 5 extending under spring clips 6 fastened to the under side of the guard 3. These loops 5 desirably extend sufficiently so that they may readily be engaged by snaps 7 at the ends of suspension cords 8 when the appliance is to be used as a baby swing. These suspension cords, which are preferably four in number, are desirably spaced from each other at a considerable height above the snaps 7 by a rectangular wire frame 9, and desirably terminate in a single suspension ring 10 after the general manner of Fig. 6. When the parts are connected as in Fig. 6, it will be obvious that the seat-carrier is supported by the cords independently of the wooden ring 3, which ring merely acts as a guard, as a hand-hold, and as a convenient support for the tray 4. The spring clips 6 prevent the guard ring 3 from rotating on the seat-carrier, thus maintaining the tray continuously in front of the child. When not in use and hence not subjected to the weight of the child, the wire 2 and the seat carried thereby can readily be detached from the guard ring 3 by partially rotating it, thereby enabling the seat to be held under a faucet or otherwise manipulated for washing the same.

When my appliance is to be used as a baby walker, the snaps 7 are detached from the loops 3 and the seat carrier is supported by the legs of a wheeled frame. This frame desirably consists of a steel hoop 11 equipped with casters 12 and having three resilient legs pivoted to the inner face of this hoop. Each leg may consist of two overlapping portions connected by bolts as shown in Figs. 2 and 5, thereby permitting the effective length of the legs to be varied according to the height of the child. The lower end of each leg preferably is bent at an oblique angle so as to afford approximately the proper angle for compensating between the differences in diameters of the seat carrier and the hoop 11 as shown in Fig. 2. This oblique angle also is preferably such that the main portion of the leg will be longer than the cord of the arc which this portion tends to assume with respect to the hoop 11 when the leg is swung about its pivot and approximately into the plane of the hoop, as shown at the left hand of Fig. 5. Consequently, each leg must be flexed somewhat to dispose it within the hoop, as shown in dotted lines in Fig. 5, and the pressure due to this flexing automatically holds the legs within the hoop. Thus constructed, this frame portion occupies a very small space when compacted, and may be freely handled without having the legs swing out of their guarded position within the hoop.

When this frame is to be used, the free ends of the legs are snapped out of the hoop and are secured to the seat-carrier, this being desirably done by means of thumb-bolts 13 carried by the wooden guard ring 3 and so arranged as to clamp the free end of each leg 14 against a portion of the seat-carrier. With this in mind, I desirably provide a slot near the free end of each leg, which slot may house a portion of the shank of the bolt 13, and I desirably bend the extreme tip of the leg 14, so as to hook under the textile-covered seat-carrier, as shown in Figs. 3 and 4. In this manner, I can quickly and effectively clamp the seat-carrier between the guard ring 3 and the upper ends of all of the legs, this being done by rotating the thumb-nuts 13 without requiring the use of any tools. With the parts thus assembled, the weight of the seat-carrier is borne by the legs, so that the guard 3 serves only as an ornament, a means of concealing the upper ends of the legs, and as a support for the tray 4. Owing to the clamping just described, the ring 3 and the tray 4 are kept from rotating with respect to the seat carrier, so that the entire walker forms a strong and rigid structure. However, by loosening the three thumb-nuts of the bolts 13, the guard 3 and the seat-carrier held to the latter by the spring clips 6 can be automatically and quickly detached from the legs, after which the latter can be swung down and flexed within the hoop, thus permitting the parts to be stored in very small space. However, while I have pictured and described my appliance as having a seat-carrier formed from a single piece of wire with loops projecting beyond the periphery of the guard ring 3, as having a seat of textile material, and as having a base carrying three legs, I do not wish to be limited to these or other details of the construction and arrangement here described, it being obvious that the same might be modified in many ways without departing from the spirit of my invention.

I claim as my invention:

1. In a baby walker, a base ring, a plurality of legs pivoted at their lower ends to the inner face of the said ring on pivots extending substantially radially of the ring, whereby the legs are adapted to be disposed substantially within the plane of said ring, each of the said legs normally extending upwardly and presenting a substantially horizontal free end; a seat-carrier having portions resting upon the said horizontal free ends of the legs, and means for simultaneously securing the seat-carrier to these ends and holding the latter in rigidly spaced formation.

2. In a baby walker, a wheeled structure including upwardly extending legs equipped at its upper end with an upwardly facing recess, a seat-carrier having portions resting in the recesses of the legs, an arm rest, and means for simultaneously securing the arm rest to the legs and clamping the seat-carrier therebetween.

3. A baby walker including an arm rest, a seat-carrier, a plurality of legs, conjointly operating means for fastening the legs and the seat carrier to the arm rest, and means independent of the said conjointly operating means for securing the seat-carrier to the arm rest.

4. A baby walker or baby swing, including an arm rest, a seat-carrier disposed below the same, means engaging the seat-carrier for supporting the latter, and conjointly acting means for securing both the said supporting means and the arm rest to the seat-carrier.

5. A baby walker or baby swing, including an arm rest, a seat-carrier disposed below the same, means engaging the seat-carrier for supporting the latter, and securing means independent of the said supporting means for securing the seat-carrier to the arm rest.

6. An appliance as per claim 5, in which the said securing means permit the detachment of the seat-carrier from the arm rest by a relative rotation thereof.

7. In a baby swing, an arm-rest, a seat-carrier, disposed below and adapted to support the arm rest, suspension means engaged with the seat-carrier, and means independent of the suspension means for securing the seat-carrier to the arm rest.

8. A baby swing including an arm rest, a seat-carrier disposed below and adapted to support the arm rest, said seat-carrier being made of wire and having a plurality of loops projecting laterally beyond said carrier, and suspending members respectively engaged with the said loops.

9. In a baby walker, a seat, and a support for the seat including a ring and a plurality of legs pivoted to the inner face of the ring and adapted to be moved about their pivots and disposed substantially in the plane of the ring; each of said legs being of resilient material and of such shape as to compel a flexing thereof to permit the disposing of the leg in the said plane of the ring.

10. In a baby walker, a seat, and a support for the seat including a ring and a plurality of legs pivoted to the inner face of the ring and adapted to be moved about their pivots and disposed substantially in the plane of the ring; each of said legs comprising a relatively short portion pivoted to the ring and disposed substantially parallel to the adjacent part of the ring, and a longer portion bent at an oblique angle to the aforesaid portion, the said angle being more oblique than the angle which would be afforded between the said adjacent part of the ring and a cord of the ring equal in length to the said longer portion of the leg.

11. In a baby swing, an arm rest, a seat-carrier disposed below and adapted to support the arm rest, suspension means engaged with the seat-carrier, and means independent of the suspension means for preventing relative lateral movement of the seat-carrier with respect to the arm rest.

12. An article of the class described, comprising a wheeled structure including upwardly extending legs, plural suspension means, and a seat-carrier having separate plural portions respectively disposed for engaging the suspension means and the legs.

Signed at Chicago, Illinois, April 18, 1918.

ARTHUR WESLEY.